Sept. 2, 1958     E. A. BODKIN ET AL     2,850,438
LIQUID SOLIDS CONTACTING
Filed Oct. 22, 1953     2 Sheets-Sheet 2
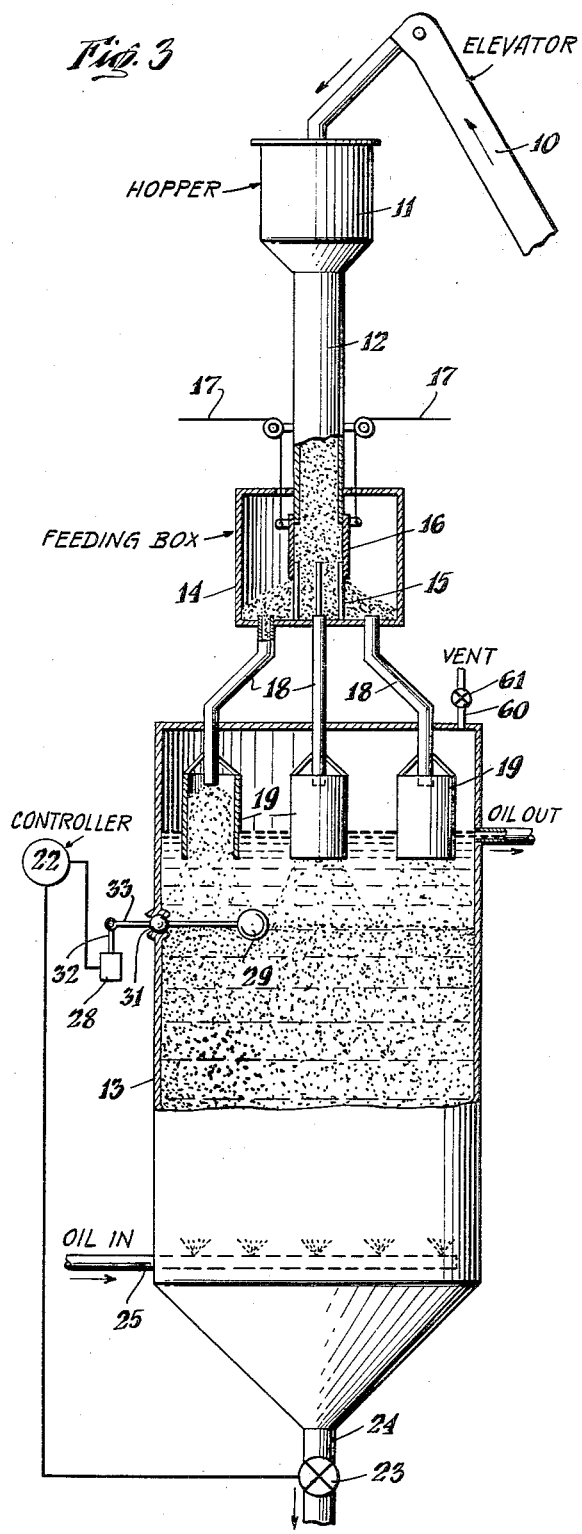
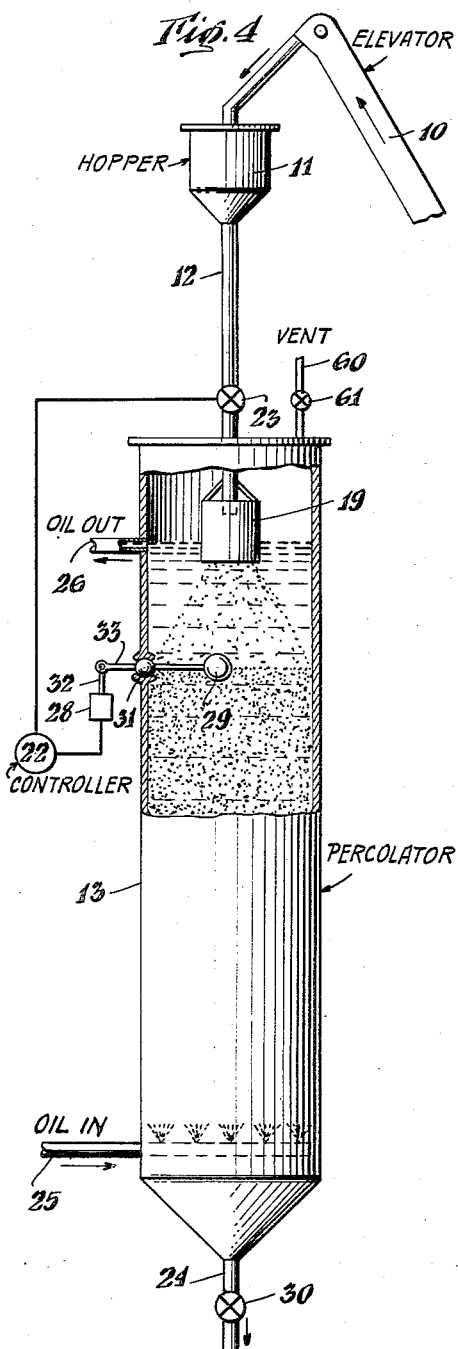
INVENTORS
Ernest A. Bodkin
Joseph I. Savoca
BY
Andrew L. Gaboriault
AGENT United States Patent Office 2,850,438
Patented Sept. 2, 1958

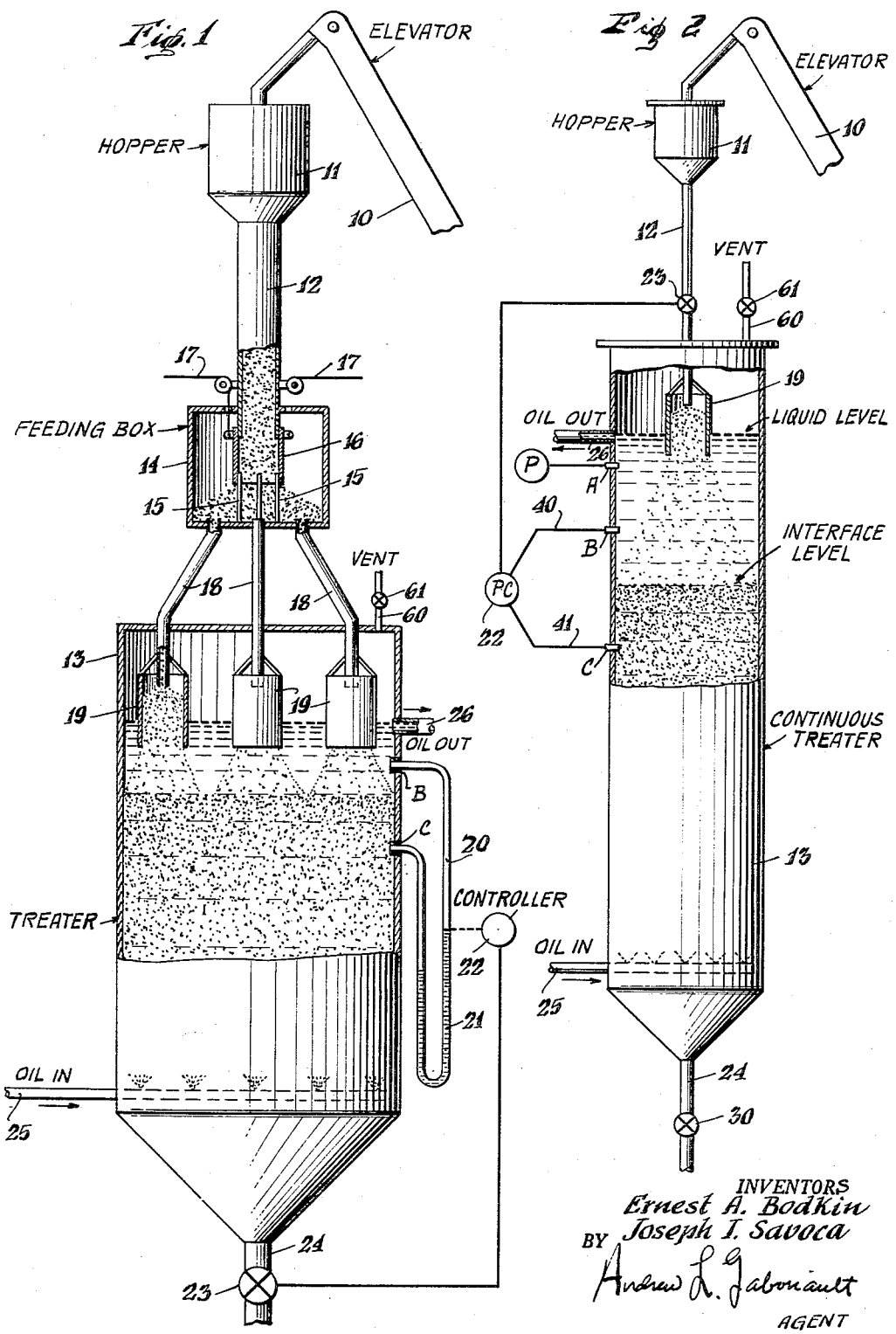

2,850,438

LIQUID SOLIDS CONTACTING

Ernest A. Bodkin, Wenonah, and Joseph I. Savoca, Woodstown, N. J., assignors to Socony Mobil Oil Company, Inc., a corporation of New York Application October 22, 1953, Serial No. 387,744

5 Claims. (Cl. 196—147)

This application is a continuation-in-part of application Serial No. 237,190, filed in the United States Patent Office on July 17, 1951, and now abandoned.

This invention relates to processes for contacting liquids with a moving columnar mass of granular solids, and more particularly to a method for maintaining the upper level of the columnar mass of granular solids constant in such processes.

Typical of the processes to which this invention applies is the process for treating a lubricating oil of low asphalt content with a solid granular adsorbent for the purpose of removing small amounts of undesirable impurities therefrom. Such purification may accomplish decolorization or neutralization of the oil, or removal of suspended, colloidal or dissolved impurities, such as carbon or coke or oxygen or nitrogen containing impurities. Other typical processes to which this invention applies are water treatment with granular ion exchange materials, the conversion of hydrocarbons in liquid phase in the presence of a granular catalytic or inert material, and the revivification of granular solid adsorbents by contacting the adsorbent with a liquid organic solvent capable of removing the impurities adhering to the adsorbent.

In such processes it is frequently desirable to maintain the granular solids as a columnar mass or bed within a confined contacting zone. Liquid is passed upwardly through the bed at a velocity below that which would substantially disrupt the bed or interfere with true countercurrent contacting of solids and liquid. While the liquid velocity may be permitted to rise to a point which causes some expansion of the mass, it is generally not desirable to permit it to rise to a level at which the granular solid particles are carried upwardly.

In most of these processes it is desirable to withdraw the liquid from the contacting zone at a level spaced above the upper surface level of the columnar mass. This serves to avoid any carry-over of solid particles from the mass through the liquid outlet, since the liquid body thereby formed above the mass will act as a settling space for the particles. It is important in all of these processes to maintain the contact time between liquid and granular solids substantially constant, so that the liquid is neither overcontacted nor undercontacted. To achieve this end, it is obviously important that the columnar mass be maintained at some fixed height. Likewise, a bed level which rises too high might cause entrainment of the solid particles in the liquid product stream.

A major object of this invention is to provide in a continuous process for contacting liquid countercurrently with a columnar mass of granular solids, a method for maintaining substantially constant the surface level of the columnar mass.

Another object of this invention is to provide a continuous process for treating liquids with granular solids which provides for efficient and effective contacting of solids and liquid without serious entrainment of the solids with the liquid product.

Another object of this invention is to provide an improved method for purifying liquid hydrocarbon oils with granular adsorbents which provides for efficient purification without excessive loss of adsorbent in the oil product stream.

A further object of this invention is to provide a method for efficiently washing adhering oil from an adsorbent which has been used in treating a liquid hydrocarbon oil.

These and other objects of the invention will become apparent from the following description of the invention.

Broadly, this invention provides a method for contacting liquids and granular solids in which a columnar mass or bed of the solids is maintained within a confined contacting zone. Liquid to be contacted is supplied to the lower section of this bed and passed upwardly therethrough at a velocity insufficient to substantially disrupt the bed or interfere with downward movement of the particles through the bed. Liquid is withdrawn from the upper section of the contacting zone at a level above the surface of the mass. Granular solids are continuously supplied to the upper section of the mass and continuously removed from the lower section thereof. The position of the upper surface of the mass is measured and a controlling device actuated in response to the measurement to control the flow of solids in either the stream entering or the stream leaving the contacting zone so as to maintain the level of the upper surface of the mass substantially constant within a predetermined narrow range. Thus, the length of bed which the liquid will traverse is maintained substantially constant at all times, providing for the proper degree of contacting and avoiding entrainment of solids in the liquid products stream. In more specific forms, this invention provides for measuring the level of the upper surface of the columnar mass by measuring the pressure drop between two points, one above and one below the desired bed level.

This invention will be best understood by referring to the attached drawings, of which Figure 1 is an elevational view, partially in section, illustrating the application of one form of this invention to a continuous lubricating oil treating process;

Figure 2 is an elevational view, partially in section, of a similar lubricating oil treater to which is applied a second form of this invention;

Figure 3 is an elevational view, partially in section, illustrating the application of a third device within the broader scope of this invention applied to a lubricating oil treating process; and Figure 4 is an elevational view, partially in section, illustrating a fourth form of device within the broader scope of this invention.

All of these drawings are highly diagrammatic in form and like parts in all bear like numerals.

The granular solids employed in the process of this invention should be of palpable particulate form as distinguished from finely divided powders. Solids generally should be within the range about 4–100 mesh, and preferably 10–60 mesh, and still more preferably 15–30 mesh by Tyler standard screen analysis. The solid particles may take the form of pellets, capsules, pills, spheres or the like, or granules of irregular shape, such as are obtained by grinding and screening. The terms "palpable particulate form" and "granular" are employed herein in describing and claiming this invention to generically cover particles of any or all of these shapes having substantial size as distinguished from finely divided powders.

While this invention has wide applicability to various liquid-solid contacting processes, it will be described in connection with a continuous lubricating oil treating process for the sake of simplicity but without intent to limit the invention. A recently developed continuous oil percolation process to which this invention is particularly applicable is described and claimed in new U. S. Patent No. 2,701,786 to Evans et al. and Figure 1 shows a treating vessel suitable for use in this process. Typical adsorbents suitable for use therein are fuller's earth, bauxite, bentonite, bone char, charcoal, magnesium silicate, heat and acid activated kaolin and activated carbon. Synthetic silica or alumina or silica-alumina gel may also be employed, but preferably the preparation thereof should be controlled to provide a pore structure similar to that of the clay type adsorbents wherein substantially more than thirty per cent of the total pore volume is occupied by macropores (i. e., pores having radii greater than 100 Angstrom units).

In Figure 1, fresh, active adsorbent is gravitated from a supply hopper 11 through conduit 12 into a feed box 14. Adsorbent enters the box through slots 15 and then passes into the treating vessel 13 through passages 18. The rate at which adsorbent enters the vessel may be controlled by raising or lowering sleeve 16 by means of cables 17. The sleeve serves as a fixed throttle on the adsorbent charge rate. This apparatus for supplying granular solids to the treating zone is described and claimed in U. S. Patent 2,745,795 to Penick et al. Solids discharge from passages 18 within treater 13 into sleeves 19 of larger cross-section than passages 18, from which the adsorbent discharges into the treating zone proper. The adsorbent supplied through members 18 and 19 passes downwardly through the treating zone, extending through most of the length of the zone as a downwardly gravitating columnar mass or bed. Liquid oil to be treated is introduced into the lower section of this bed through passage 25, located near the lower end of vessel 13. The oil may be preheated before it is supplied to the treating zone in order to reduce its viscosity, if desired. Suitable preheating temperatures fall within the range about 0–700° F. and should generally be below the flash point of the oil. In a typical mineral oil decolorization process, the oil might be heated to a temperature of 300° F. before introduction into the treating zone. Oil charge passes upwardly through the bed of adsorbent and the desired treatment is effected thereby. The rate of oil passage should be below that which would disrupt the bed or cause the particles therein to move in other than substantially downward fashion. The treated oil is removed from the upper section of the treating zone through passage 26, which is situated substantially above the upper surface of the adsorbent bed. This results in a body of liquid existing above the bed with liquid surface at above the level of passage 26. It is preferable that sleeves 19 extend downwardly substantially below the surface of the liquid. For example, the lower end of sleeves 19, from which adsorbent is discharged, may be about 6 inches below the liquid surface, and preferably about 18–36 inches therebelow. The upper ends of sleeves 19 should, however, be above the liquid surface. This system will avoid substantial entrainment of solids in the liquid product, and is disclosed in more detail and claimed in and now U. S. Patent No. 2,749,290 to Penick et al.

The treating vessel 13 is preferably an elongated cylindrical vessel. Adsorbent is withdrawn from the vessel and from the lower end of the bed therein through a conduit 24 at a rate controlled by valve 23. The adsorbent will then normally be washed and then dried before being regenerated in some suitable fashion, such as by burning in a kiln. The regenerated adsorbent is returned to hopper 11 by means of elevator 10. While the adsorbent in the treating zone should be maintained as a columnar mass and the velocity of oil through the mass should be below that velocity which would disrupt it, a slight separation of the particles in the mass which does not interfere with the downward movement of the particles is acceptable. The bed in this condition is defined as an expanded bed in that the surface is lifted slightly above what it would be in compacted form. It has been discovered that if the upper surface of this bed is carefully measured and such measurement is used to control either the inlet or outlet adsorbent streams so as to maintain the bed level and therefore the length of bed substantially constant, highly efficient liquid treatment may be effected without substantial carry-over of adsorbent particles in the liquid product.

In Figure 1, a U-tube manometer 20 is shown with upper end connected into treater 13 above the level of the solids bed in the treater but below the liquid surface level. The other end of the manometer is connected into the treater at a point below the bed surface. A dense liquid 21 is used to indicate pressure differential between these two points. The manometer legs above the dense liquid are filled with oil under treatment so that the static head of oil between the two points is balanced out. This manometer indicates the pressure drop between the two points of attachment, B and C, which pressure drop is due almost entirely to the flow of liquid through that portion of the solids bed lying above point C. The manometer, therefore, accurately indicates the level of this upper surface in the treater and actuates a controller 22. Controller 22 is connected to the outlet valve or control device 23 in withdrawal conduit 24. In response to changes in the bed level, as indicated by the manometer, the controller automatically operates device 23 to readjust the bed level to the desired constant level. Controller 22 may be any of the well known devices for transmitting pressure differential measurement into mechanical movement to operate device 23. For example, controller 22 may be a relay operated controller.

As previously stated, it is necessary, in order to provide effective liquid-solid contacting and process and operational stability, that the upper surface of the solids bed be maintained substantially constant within a narrow range of levels. This is preferably done by controlling the withdrawal rate of solids. While control device 23 is shown diagrammatically as a valve, it is broadly any system for the accurate control of granular solids flow. Preferably, the devices disclosed in U. S. patent applications, Serial Nos. 376,686 and 376,687, both filed August 26, 1953, are used. Star valves may also be used, particularly when the improvement disclosed in U. S. Patent 2,794,772 to Savoca et al. is used. Member 23 is intended to indicate any one of these devices as well as any other suitable device.

Although the control of the solids outlet is preferred, in less preferred form of this invention the control of the inlet conduit in response to the pressure differential reading may be practiced. Such a system is shown in Figure 2, which is similar to Figure 1, except that a fixed throttle 30 is used in the outlet conduit 22, while the variable flow control device, such as a star valve or plug valve, is provided in inlet conduit 12. A pressure controller 22 is used to automatically control device or valve 23, rather than using a manometer as in Figure 1. This controller is connected to pressure taps B and C in the side of the treating vessel by means of conduits 40 and 41. These conduits are preferably filled with the same liquid which is undergoing treatment so that the static head between the two points is cancelled out.

It has been discovered that if pressure taps are located at substantially equal intervals along the length of the vessel near the level of the upper surface of the columnar mass of solids therein, that the pressure of the liquid above the upper surface is substantially constant, while the pressure below the surface varies substantially directly with the level of the bed located above the pressure tap. For example, in Figure 2, pressure taps A and B would show substantially identical pressures if the static head between the two points is cancelled out, whereas the pressure at tap C would vary with the change in bed level. This is what provides for the effective indications of bed level and the ability to maintain the bed level constant.

While it is preferable to fill the legs of the manometer or pressure controlled used with the liquid under treatment in order to balance out the static head, this is not necessary within the broader scope of the invention.

Figure 3 illustrates another means of level control which falls within the broader scope of this invention. This means is claimed specifically in U. S. patent application, Serial No. 387,743, filed October 22, 1953. It has been discovered that when the columnar mass is in the expanded condition, that the mass with liquid flowing therethrough will have a substantially different density from that of the liquid in the liquid body above the mass. Further, it has been discovered that if a float 29 of a density intermediate between the liquid and the liquid-solids mixture in the columnar mass is suspended in the contacting vessel, it will rise to the upper surface of the columnar mass and retain at that level following any variation in the upper surface. In Figure 3, there is shown a treating vessel similar to that of Figures 1 and 2. The float 29, of the proper density, is suspended in this treating vessel and floats on the upper surface of the columnar mass at its interface with the liquid body thereabove. Float 29 is connected to a lever 33, which extends through the wall of the contacting vessel and is pivoted on a pin 31. The movement of the outer end of lever 33, in response to variations in the upper surface of the columnar mass, is transmitted to an operator 28 through a connecting link 32. The operator is connected to a controller 22. The controller 22, in response to the measurement of the bed level by float 29, operates the granular solids outlet control device 23 to maintain the upper surface of the columnar mass substantially constant within a narrow range of levels, all of which lie below the liquid surface level. The use of the float surface level measurement device to control the granular solids inlet rather than the outlet may also be used in broader forms of this invention, as shown in Figure 4. As previously stated, it is desirable, although not necessary, to introduce the adsorbent at a level substantially below the liquid surface. For example, it is desirable that the point of passage of solids be at least 6 inches, and preferably 18–36 inches below the liquid surface. Likewise, it is desirable to maintain the surface level of the granular solids bed at least 6 inches below the solids inlet and preferably 18–36 inches therebelow. This has the advantage of providing a more uniform upper surface to the columnar mass without any substantial peaks and valleys.

As well as its many other uses, this invention will also find use in the washing step of a continuous percolation process. This step normally follows the oil-solids contacting and may be performed in a vessel similar to that shown in Figures 1 through 4. Adsorbent can only be withdrawn from the percolation step admixed with a certain amount of oil. This oil may either be in the pores of the adsorbent or in the voids between the adsorbent particles, and for economical operation, it is desirable that it be recovered. The adsorbent and adhering oil would be charged to the upper end of a vessel, like 13, and pass therethrough as a columnar mass. The process would operate in a very similar manner to the percolation step, except that a wash solvent would be supplied through passage 25 rather than oil charge. Washed adsorbent would be withdrawn through 26 and the bed level of adsorbent in the washer would be controlled by measuring the bed level, using either the pressure drop method of Figures 1 and 2 or the float method of Figures 3 and 4, and actuating a control device in either the adsorbent outlet or inlet in the same manner as described in connection with the drawings. Typical solvents which might be used for the washing include carbon tetrachloride, normal heptane, normal octane, petroleum naphtha boiling within the range 100–400° F. and carbon disulfide. A preferred solvent is a paraffinic naphtha boiling within the range 210–300° F. The washing step typically might be conducted at a temperature within the range 60–250° F.

The following examples are given to illustrate the invention:

*Example I*

Using a treating vessel of 3.17 inches diameter and 12 feet high, adsorbent solids of about 30–60 mesh Tyler were introduced into the top of the vessel at a level about 18 inches below the top thereof and removed from the bottom at a flow rate of about 0.31 pound per hour. Oil was introduced into the bottom of the vessel and removed from the top at a flow rate of about 5.7 pounds per hour and an upward velocity of 2.0 feet per hour. The oil density was 0.820 and the temperature of the oil was maintained at about 80° F. The bed level was maintained at about 2 feet below the top of the vessel, and the apparent density of the adsorbent bed was about 70 pounds per cubic foot.

Pressure taps A, B, C and D were located 9, 18, 30 and 42 inches below the top of the vessel. The pressure differential between A and B was substantially 0 inch of water, that between B and C was 9.2 inches of water and that between C and D 20.6 inches of water. The data shows that the pressure drop between taps B and C was caused entirely by the pressure of the adsorbent bed between points B and C. From the pressure measurement between taps C and D, both below the interface level, the indicated pressure drop is found to be $$\frac{20.6}{12}$$

or 1.7 inches of water per inch of adsorbent bed. The height of the adsorbent bed above tap C was found by dividing the pressure differential between points B and C by this factor, viz., $$\frac{9.2}{1.7}=5\tfrac{1}{2} \text{ inches}$$

above point C.

This pressure differential was used to maintain the flow rate of solids through the discharge conduit substantially constant and thereby maintain the interface level substantially constant.

*Example II*

Using a treating vessel of 3.2 inches in diameter and 3.5 feet in height, adsorbent solids of about 30–60 mesh Tyler were introduced into the top of the vessel at a level about 12 inches below its upper end. The solids were removed from the bottom of the vessel at a flow rate of about 0.31 pound per hour. Oil at 73° F. was introduced into the bottom of the vessel at a rate of about 5.7 pounds per hour and flowed upwardly through the vessel at a superficial velocity of 2 feet per hour. The oil density at the temperature of introduction was 0.817 gram per cubic centimeter. The bed level with no flow therethrough was 2.540 feet in height, whereas in expanded condition it was 2.594 feet. Under these conditions, it was found that a float, having a density of 0.8350 gram per cubic centimeter, was highly responsive to changes in level of the bed and could be used to effect control of the valve in the adsorbent outlet to provide a constant bed level for process and operational stability.

This invention should be understood to cover all changes and modifications of the examples of the invention herein chosen for purposes of disclosure which do not constitute departures from the spirit and scope of the invention.

We claim:

1. A continuous process for the countercurrent contacting of liquid hydrocarbon oils with adsorbents of palpable particulate form in order to remove small amounts of impurities from the liquid oils, which comprises: maintaining a columnar mass of adsorbent within a confined treating zone, supplying liquid oil charge to the lower section of the mass and passing the liquid oil upwardly through the mass at a velocity insufficient to substantially disrupt the mass and thereby effect the desired treatment, removing oil from the upper section of the treating zone at a level substantially above the upper end of the mass, whereby a liquid surface is formed in the upper section of the treating zone, supplying adsorbent to the upper section of the contacting zone through an inlet flow passage and withdrawing adsorbent from the lower section of the treating zone through an outlet flow passage, measuring the pressure differential due to liquid flow through the mass between a selected level above the upper surface of the mass but below the liquid surface and a selected level below the upper surface of the mass, and adjusting the flow of adsorbent in one of said flow passages in response to said pressure differential measurement to maintain the upper surface of the mass at a substantially constant level within a predetermined narrow range below the liquid surface.

2. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at a level beneath the liquid surface level in the percolation zone, withdrawing the adsorbent from the lower portion of said zone at a flow rate low enough to maintain a columnar mass with the upper surface level in said percolation zone below the level at which the material is discharged from said confined passage, maintaining the flow rate of the upwardly moving oil in said percolation zone at a rate insufficient to substantially disrupt the mass of adsorbent in said zone, measuring the pressure differential between a selected level above the mass upper surface level and a level below the desired mass upper surface level that is caused solely by the passage of the oil through the adsorbent bed between the points, and adjusting the flow rate at which the adsorbent is withdrawn from said percolation zone in response to any change in said measured pressure differential, whereby the mass upper surface level is maintained substantially constant.

3. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at a level beneath the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the mass of adsorbent in said zone, measuring the pressure differential between two points, the upper being above the desired mass upper surface level and also above the level of solids entry into the liquid column but below the liquid surface level, the lower being below the desired mass upper surface level, the pressure differential being caused solely by the passage of the oil through the mass between the two points, and adjusting the flow rate at which the adsorbent is withdrawn from said percolation zone in response to any change in said measured pressure differential, whereby the mass upper surface level is maintained substantially constant.

4. In a continuous cyclic process for treating oils to purify the same, the improved method of contacting the oil and solid adsorbent, which comprises: introducing an oil feed in the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at a level at least 6 inches beneath the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the mass of adsorbent in said zone measuring the pressure differential between two points, the upper being above the desired mass upper surface level and also above the level of solids entry into the liquid column but below the liquid surface level, the lower being below the desired mass upper surface level, the pressure differential being caused solely by the passage of the oil through the mass between the two points, and adjusting the flow rate at which the adsorbent is withdrawn from said percolation zone in response to any change in said measured pressure differential, whereby the mass upper surface level is maintained substantially constant.

5. In a continuous cyclic process for treating oils to purify the same, the improved method of contacting the oil and solid adsorbent, which comprises: introducing an oil feed into the lower section of a vertically extended percolation zone and withdrawing the oil from said zone at a higher elevation to maintain a liquid surface level in the upper portion of said zone, introducing adsorbent in palpable particulate form into the percolation zone through at least one laterally confined passage which is terminated at its lower end at a level between 18–36 inches beneath the liquid surface level in the percolation zone, withdrawing the adsorbent from the lower portion of said zone at a flow rate low enough to maintain a columnar mass with upper surface level in said percolation zone below the level at which the material is discharged from said confined passage, maintaining the flow rate of the upwardly moving oil in said percolation zone at a rate insufficient to substantially disrupt the mass of adsorbent in said zone, measuring the pressure differential between two points, the upper being above the desired mass upper surface level and also above the level of solids entry into the liquid column but below the liquid surface level, the lower being below the desired mass upper surface level, the pressure differential being caused solely by the passage of the oil through the mass between the two points, and adjusting the flow rate at which the adsorbent is withdrawn from said percolation zone in response to any change in said measured pressure differential, whereby the mass upper surface level is maintained substantially constant.

References Cited in the file of this patent

UNITED STATES PATENTS

| | | |
|---|---|---|
| 2,230,782 | Maust | Feb. 4, 1941 |
| 2,438,728 | Tyson | Mar. 30, 1948 |
| 2,458,162 | Hagerbaumer | Jan. 4, 1949 |
| 2,479,339 | Claussen et al. | May 17, 1949 |
| 2,552,435 | Knox et al. | May 8, 1951 |
| 2,606,863 | Rehbein | Aug. 12, 1952 |
| 2,631,727 | Cichelli | May 17, 1953 |
| 2,696,305 | Slover | Dec. 7, 1954 |